E. RIMAILHO.
ENDLESS TRACK MEMBER FOR THE PROPULSION OF VEHICLES.
APPLICATION FILED JUNE 10, 1920.
1,438,859.
Patented Dec. 12, 1922.
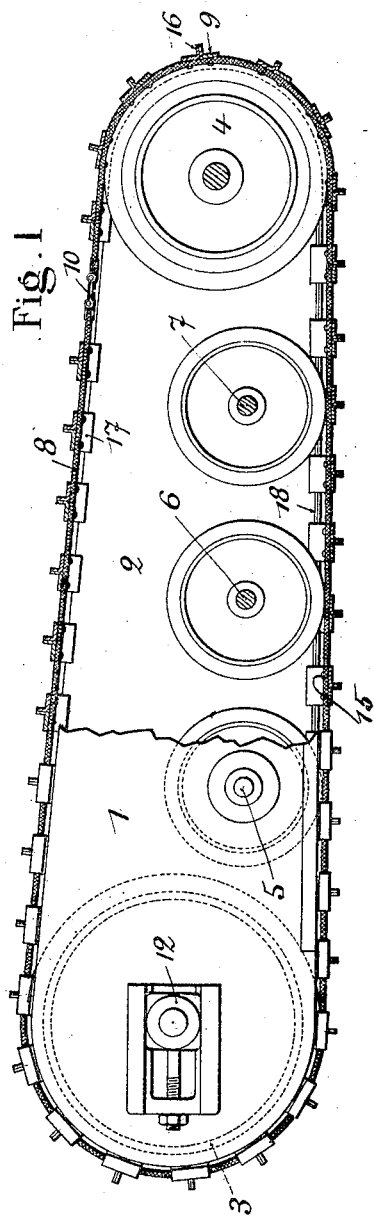
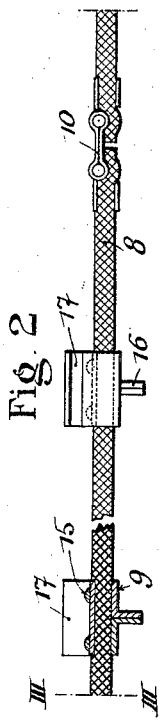
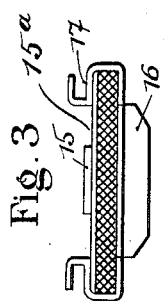
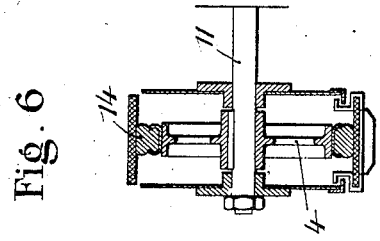
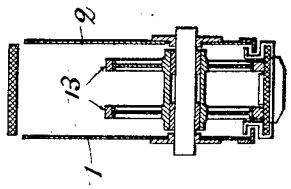
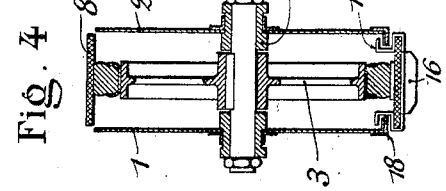
Inventor
Emile Rimailho
By H. B. Willson &c.
Attorneys Patented Dec. 12, 1922.

1,438,859

UNITED STATES PATENT OFFICE.

EMILE RIMAILHO, OF PARIS, FRANCE.

ENDLESS-TRACK MEMBER FOR THE PROPULSION OF VEHICLES.

Application filed June 10, 1920. Serial No. 387,955.

*To all whom it may concern:*

Be it known that I, EMILE RIMAILHO, a citizen of the Republic of France, residing at Paris, France, have invented certain new and useful Improvements in Endless-Track Members for the Propulsion of Vehicles, of which the following is a specification.

The present invention has for its object to obtain flexible bands constituting light endless tracks of economical construction, which shall require no other link or shaft except those situated at the junction of the two extremities, at the same time possessing a great flexibility of operation and assuring a perfect contact with the soil.

This result is obtained by employing a band or belt of flexible material such for instance as vegetable fibres, metal wires or strips, leather strips, or the like, and provided on the outer side with projections for gripping into the soil.

The accompanying drawing shows by way of example a flexible belt constructed according to this invention.

Fig. 1 is an elevation of an entire endless track member with the front plate partially broken away.

Fig. 2 shows the flexible belt proper, on a larger scale, the left hand portion being shown in section along the axis of the belt.

Fig. 3 is a cross-section of the said flexible belt, along the line 3—3 of Fig. 2.

Fig. 4 is a sectional view of a stretching pulley.

Fig. 5 is a sectional view of an endless track member, showing the supporting rollers.

Fig. 6 is a section of the driving pulley.

Figs. 1 and 5 represent an endless track member constituted by two lateral portions or cheeks of plate iron 1 and 2, and provided with the pulleys 3 and 4 and the rollers 5, 6 and 7. Upon these pulleys is mounted a flexible band or belt 8 provided with the members 9 for gripping into the ground, and a coupling device 10.

The pulley 4 (Fig. 6) is disposed upon a shaft 11 and is thus actuated by a motor, while the pulley 3 (Fig. 4) is employed only for stretching the flexible belt, and its shaft rotates freely in the adjustable bearings 12.

The rollers 5, 6, 7 can be provided with rubber rings 13, as shown in Fig. 5, thus avoiding the rapid wear of their roller path, and this affords a better suspension for the vehicle. The stretcher pulley may also be provided with a rubber facing 14, and a similar facing will be applied to the driving pulley. The endless band, in order to increase its adhesion upon the drums 3 and 4, will be provided with bars 15 which are mounted upon the plates 15ª and tend to sink into the rubber by reason of the pressure, or in other cases, recesses can be formed in the rubber in order to receive the cross-bars.

Figs. 2 and 3 show the method of constructing the flexible belt properly so-called. Upon a strap 8 are riveted the member 9 carrying the projections 16 for entering the soil, and the flanged parts 17 which slide upon the edges 18 of the lateral members 1, 2 in order to prevent any disengagement.

The flexible belt 8 can be constructed of braided fibres, hemp, aloes, etc. or by metal strips or wires, or in other cases by leather or any other suitable material.

Claims:

1. In a vehicle adapted to travel upon endless tracks, the combination of endless track beams comprising two lateral cheeks having inwardly extending flanges at the bottom thereof, drums disposed between said cheeks and each having a smooth and rubber-covered periphery, a continuous flexible band having its ends attached together, metallic members spaced along the external surface of said band, and metallic plates secured to the internal surface of said band, said members being adapted to enter the ground at their middle part whilst the outer ends thereof are curved upwardly in such manner as to form hooks projecting upon the internal surface of said band, said hooks being adapted to engage and to slide upon the flanges of said cheeks, and said plates having projections formed thereon and adapted to bear upon the rubber facing of said drums.

2. In a vehicle adapted to travel upon endless tracks, the combination of endless track beams comprising two lateral cheeks having inwardly extending flanges at their lower edges, drums disposed between said cheeks and each having a smooth and rubber-covered periphery, a continuous flexible band having its ends attached together, metallic members spaced along the external surface of said band, and metallic plates secured to the internal surface of said band, said members being adapted to enter the ground at their middle part whilst the outer ends thereof are curved upwardly in such manner as to form hooks projecting upon the internal surface of said band, said hooks being adapted to engage and to slide upon the flanges of said cheeks, said plates having projections formed thereon and adapted to bear upon the rubber facing of said drums, and supporting rollers mounted between said cheeks of the endless track beam, each of said rollers being provided with a rubber facing.

In testimony that I claim the foregoing as my invention I have signed my name in presence of a subscribing witness.

EMILE RIMAILHO.

Witness:
  MARCEL COMPIN.